United States Patent
Hsu et al.

(10) Patent No.: US 8,267,470 B2
(45) Date of Patent: Sep. 18, 2012

(54) POSITIONING DEVICE FOR MOUNTING A SEAT ON A SEAT TUBE OF A BICYCLE

(75) Inventors: Che-Wei Hsu, Taichung Hsien (TW); Hua-Chun Huang, Jhonghe (TW)

(73) Assignee: Giant Manufacturing Co., Ltd. (TW)

( * ) Notice: Subject to any disclaimer, the term of this patent is extended or adjusted under 35 U.S.C. 154(b) by 310 days.

(21) Appl. No.: 12/553,491

(22) Filed: Sep. 3, 2009

(65) Prior Publication Data
US 2010/0052377 A1  Mar. 4, 2010

(30) Foreign Application Priority Data
Sep. 4, 2008 (TW) ................ 97133889 A

(51) Int. Cl.
*B62J 1/08* (2006.01)
*B62J 1/00* (2006.01)
(52) U.S. Cl. .............. 297/215.14; 297/215.15
(58) Field of Classification Search . 297/215.13–215.15
See application file for complete search history.

(56) References Cited

U.S. PATENT DOCUMENTS

| | | | | |
|---|---|---|---|---|
| 3,992,054 A * | 11/1976 | Campagnolo | ............ | 297/215.15 |
| 5,228,796 A * | 7/1993 | Kao | ................ | 403/84 |
| 5,333,826 A * | 8/1994 | Lai | ............ | 248/229.14 |
| 5,383,706 A * | 1/1995 | Chen | ............ | 297/215.15 |
| 5,466,042 A * | 11/1995 | Herman | ............ | 297/215.15 |
| 5,501,506 A * | 3/1996 | Kao | ............ | 297/215.15 |
| 5,568,958 A * | 10/1996 | Chen | ............ | 297/215.15 |
| 5,649,738 A * | 7/1997 | Thomson et al. | ....... | 297/215.15 |
| 5,988,741 A * | 11/1999 | Voss et al. | ........... | 297/215.15 |
| 7,681,947 B2 * | 3/2010 | Ritchey | ............ | 297/215.14 |
| 2007/0145794 A1* | 6/2007 | Dal Pra' et al. | ............ | 297/195.1 |

* cited by examiner

*Primary Examiner* — David Dunn
*Assistant Examiner* — Tania Abraham
(74) *Attorney, Agent, or Firm* — Osha Liang LLP

(57) ABSTRACT

A positioning device includes a mount secured on a seat tube, and left and right joint members having joint surfaces which abut against the mount, and gripping cavities which mate with clamping cavities of left and right clamping members to permit lengthwise segments of left and right anchoring bars of a seat to be clamped in left and right bar-engaging zones, respectively. When the joint surfaces switch places or when the left and right clamping members are shifted, the bar-engaging zones are displaced from a first position to be proximate to corresponding ones of front and rear ends of the anchoring bars, to a second position to be proximate to the other corresponding ones of the front and rear ends of the anchoring bars, thereby enabling the seat to be adjusted to a desired position relative to the seat tube.

10 Claims, 11 Drawing Sheets

POSITIONING DEVICE FOR MOUNTING A SEAT ON A SEAT TUBE OF A BICYCLE

CROSS-REFERENCE TO RELATED APPLICATION

This application claims priority of Taiwanese patent Application No. 097133889, filed on Sep. 4, 2008, the disclosure of which is herein incorporated by reference.

BACKGROUND OF THE INVENTION

1. Field of the Invention

This invention relates to a positioning device for mounting a seat on a seat tube of a bicycle, more particularly to a positioning device which permits adjustment of the position of a seat on a seat tube of a bicycle.

2. Description of the Related Art

A conventional bicycle generally has a positioning device for mounting a seat on a seat tube of a bicycle and for adjusting the position of the seat relative to the seat tube in a front-and-rear direction so as to be suitable for different riders and to provide a feeling of comfort during riding.

Referring to FIGS. 1 and 2, a conventional positioning device 6 is used to mount a seat 7 on a seat tube 8 of a bicycle (not shown). The seat 7 includes two seat rails 71 each of which has a sliding segment 711 and two connecting segments 712 extending respectively from two ends of the sliding segment 711. The positioning device 6 includes a clamping unit 61 and a locking unit 62. The clamping unit 61 includes upper and lower clamping members 611, 612 which are disposed to respectively clamp the sliding segments 711 of the seat rails 71. The locking unit 62 is disposed to tighten the upper and lower clamping members 611, 612 together with the sliding segments 711.

During adjustment of the seat 7, the locking unit 62 is released to permit sliding of the clamping unit 6 along the sliding segments 711, so that the seat 7 can be moved relative to the seat tube 8 in a front-and-rear direction. However, the extent of adjustment of the seat 7 is limited by the configuration of the seat rails 71. If the length of the sliding segments 711 is increased to permit a greater extent of adjustment, the weight of the seat will be increased, which will adversely affect the bicycle.

SUMMARY OF THE INVENTION

An object of the present invention is to provide a positioning device which permits a relatively large extent of adjustment of the position of a seat relative to a seat tube of a bicycle in a front-and-rear direction.

According to this invention, the positioning device includes a mount and left and right clamping units.

The mount has a lower portion adapted to be secured on a seat tube of a bicycle, and an upper portion having a rest wall surface which faces upwardly and which has left and right rest regions.

The left clamping unit includes a left joint member and a left clamping member. The left joint member has a left joint surface which abuts against the left rest region, and a left gripping-side surface which is disposed to face away from the upper portion, and which has a left gripping cavity that defines a left bar-engaging zone and that terminates at front and rear edges. The left clamping member has a left clamping surface which has a left clamping cavity configured to mate with the left gripping cavity so as to permit a lengthwise segment of a left anchoring bar of a seat to be clamped in the left bar-engaging zone in a first position, where the front edge faces the front end of the left anchoring bar and where the left bar-engaging zone is proximate to one of the front and rear ends of the left anchoring bar.

The right clamping unit includes a right joint member and a right clamping member. The right joint member has a right joint surface which abuts against the right rest region, and a right gripping-side surface which is disposed to face away from the upper portion, and which has a right gripping cavity that defines a right bar-engaging zone and that terminates at front and rear edges. The right clamping member has a right clamping surface which has a right clamping cavity configured to mate with the right gripping cavity so as to permit a lengthwise segment of a right anchoring bar of the seat to be clamped in the right bar-engaging zone proximate to one of front and rear ends of the right anchoring bar and to permit the front edge of the right gripping cavity to face the front end of the right anchoring bar in the first position.

The left and right joint members are configured such that, when the left and right joint surfaces switch places so as to abut against the right and left rest regions, respectively, or when the left and right clamping units are shifted so as to permit the front edges of the left and right bar-engaging zones to face the rear ends of the left and right anchoring bars, respectively, the left and right bar-engaging zones are displaced to a second position, where the left bar-engaging zone is proximate to the other one of the front and rear ends of the left anchoring bar.

The left and right joint member are further configured such that, when the left and right bar-engaging zones are displaced from the first position to the second position, at least one tightening line, along which the left and right clamping members are brought to clamp the lengthwise segments of the left and right anchoring bars onto the upper portion, remains unchanged.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
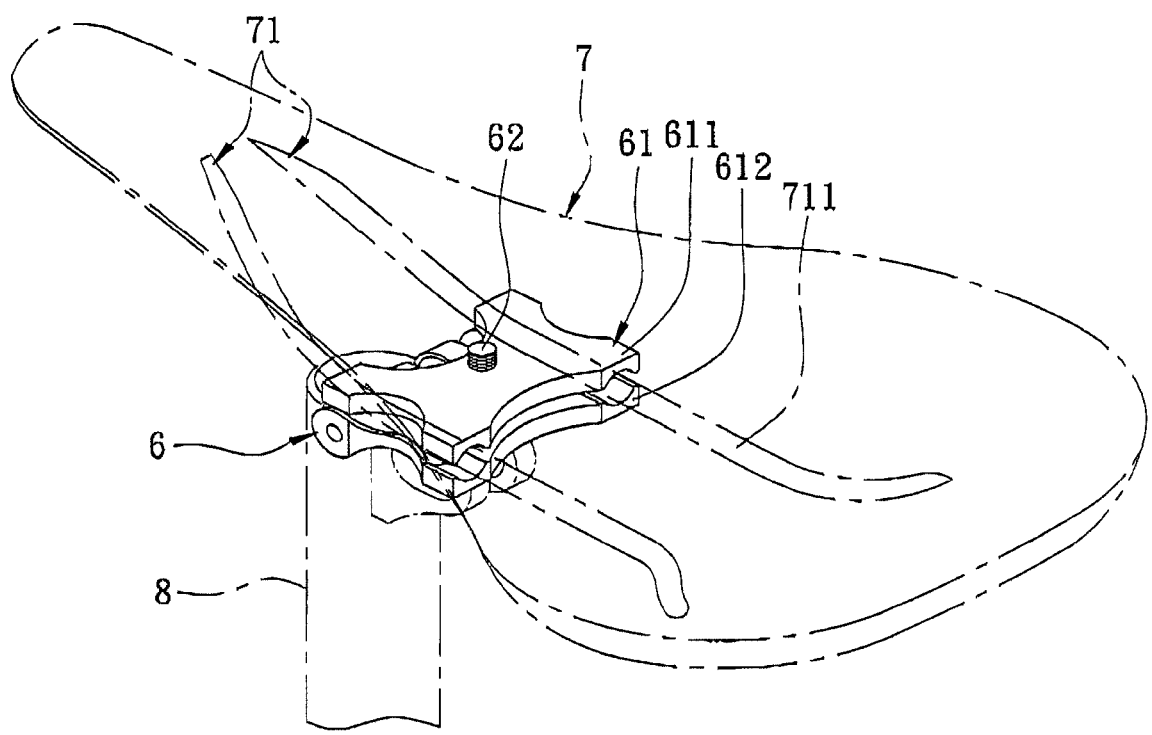
FIG. 1 is a perspective view of a conventional positioning device for mounting a seat on a seat tube of a bicycle.
Figure 2:
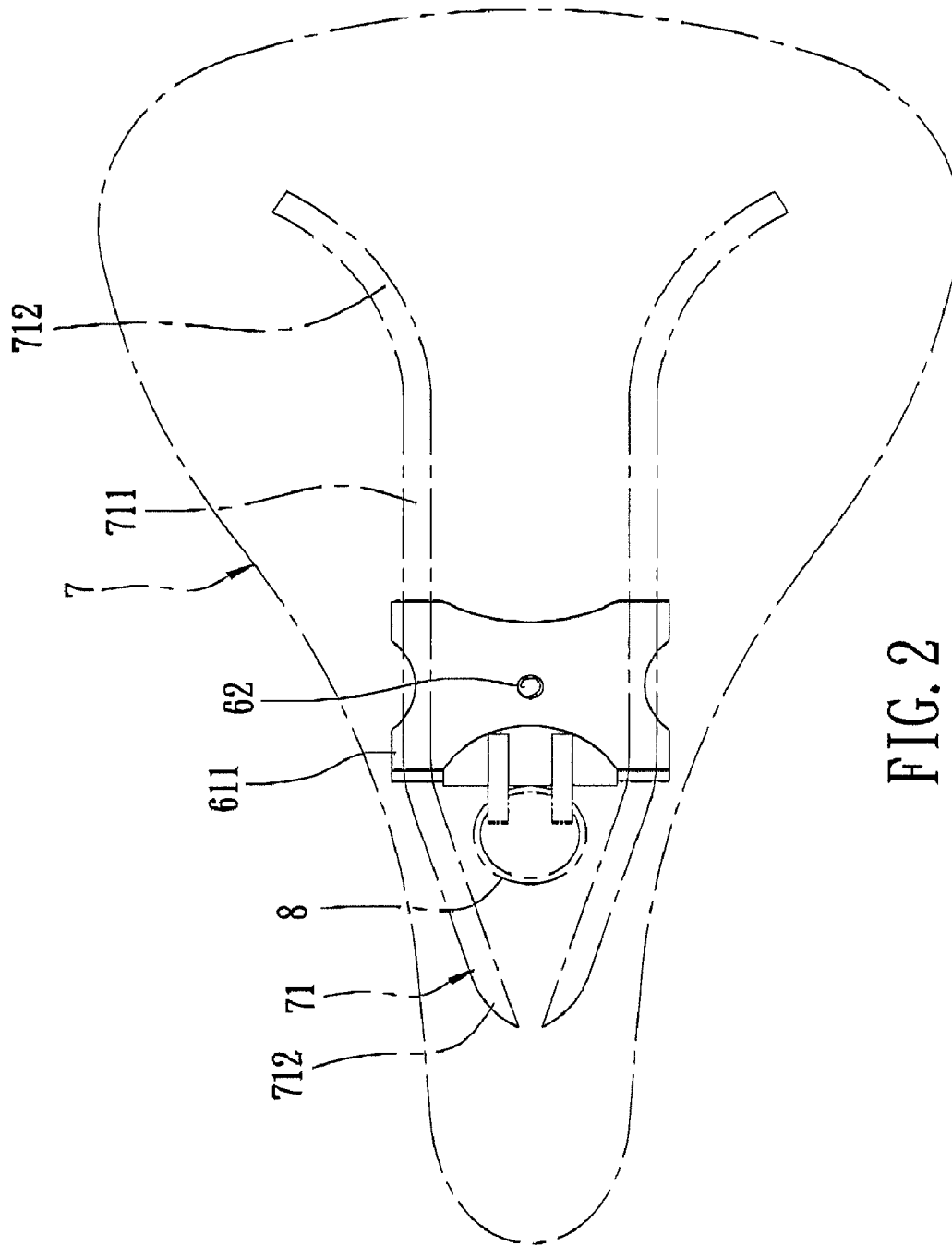
FIG. 2 is a schematic top view of the conventional positioning device in an adjusting state.

Before the present invention is described in greater detail, it should be noted that same reference numerals have been used to denote like elements throughout the specification.

Figure 3:
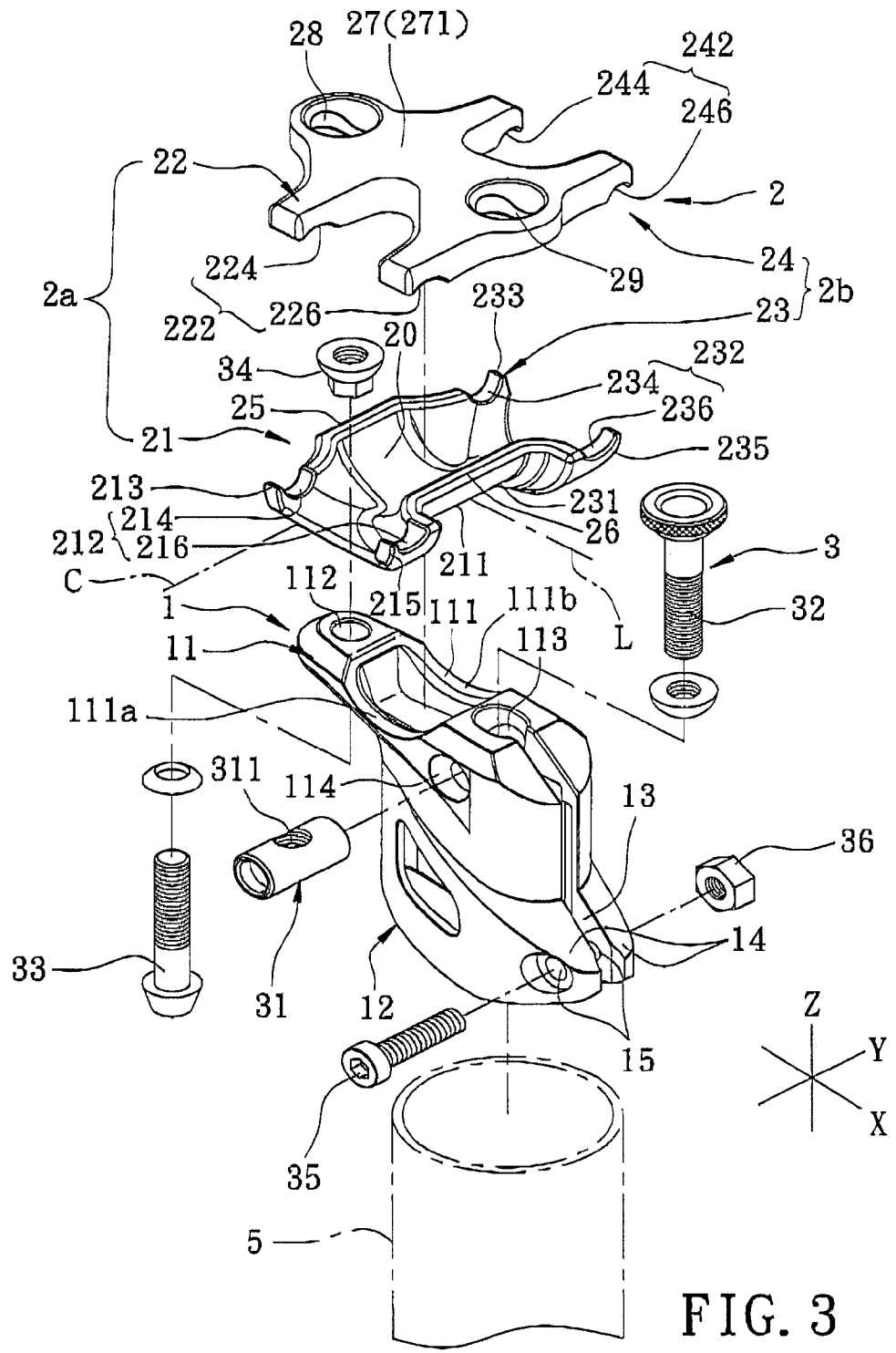
FIG. 3 is an exploded perspective view of the first preferred embodiment of a positioning device according to this invention.
Figure 4:
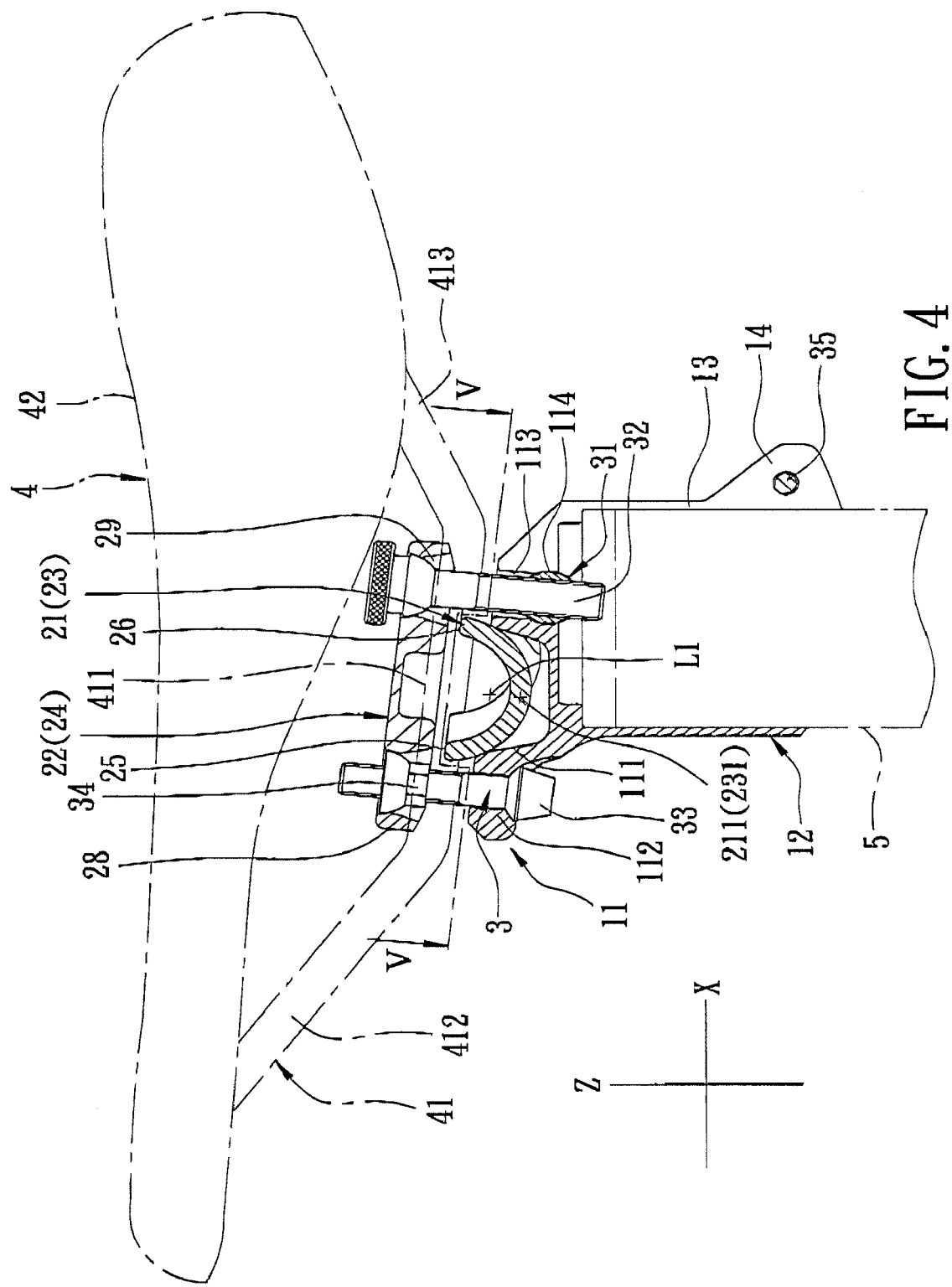
FIG. 4 is a sectional view of the first preferred embodiment, showing a clamping mechanism thereof in a first position.
Figure 5:
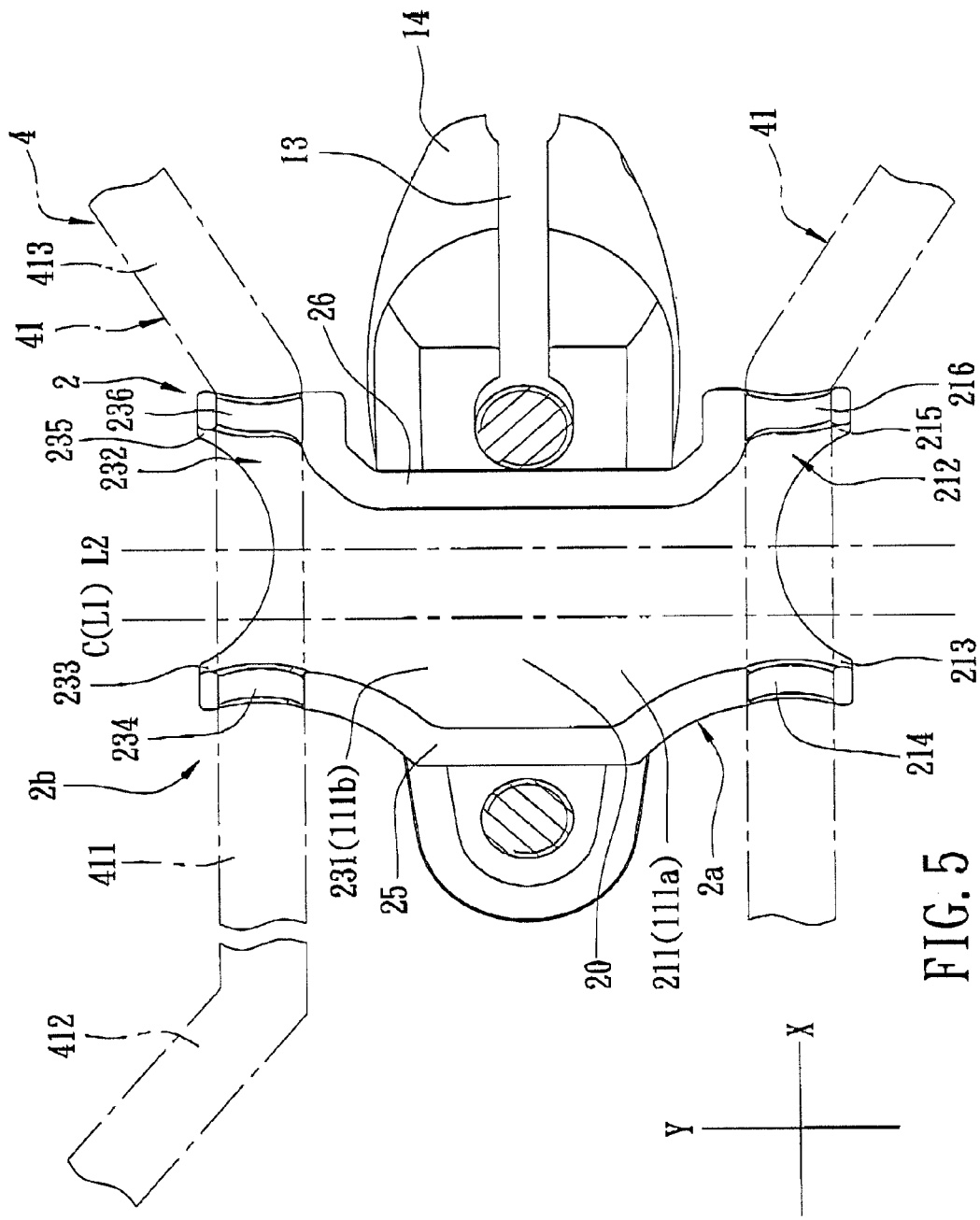
FIG. 5 is a cross-sectional view taken along lines V-V of FIG. 4.

Referring to FIGS. 3 to 5, the first preferred embodiment of a positioning device according to the present invention is used for mounting a seat 4 on a seat tube 5 of a bicycle (not shown). The seat 4 generally includes a saddle body 42 extending in a longitudinal direction (X), and left and right anchoring bars 41 each having front and rear ends 412, 413 opposite to each other in the longitudinal direction (X) and connected to the saddle body 42, and a lengthwise segment 411 interposed between the front and rear ends 412, 413. The lengthwise segments 411 are spaced apart from each other in a transverse direction (Y) and are spaced apart from the saddle body 42 in an upright direction (Z) transverse to the longitudinal direction (X) and the transverse direction (Y). The positioning device according to this embodiment is shown to comprise a mount 1, a clamping mechanism 2, and a tightening unit 3.

The mount 1 has a lower portion 12 which is adapted to be securely mounted on the seat tube 5, and an upper portion 11 opposite to the lower portion 12 in the upright direction (Z). In this embodiment, the lower portion 12 is sleeved on the seat tube 5 so as to be detachably secured on the seat tube 5. The upper portion 11 has a rest wall surface 111 which faces upwardly and which surrounds a first axis (L1) in the longitudinal direction (X). The rest wall surface 111 has left and right rest regions (111a, 111b) opposite to each other relative to a longitudinal line (L) that extends in the longitudinal direction (X). The mount 1 has a split 13 which is disposed in a rear side thereof and which extends through the upper and lower portions 11, 12. The upper portion 11 has front and rear bores 112, 113 formed at opposite sides of the rest wall surface 111 in the longitudinal direction (X) to define front and rear tightening lines, and an inserting hole 114 extending in the transverse direction (Y) to intersect the rear bore 113. The rear bore 113 is communicated with the split 13.

The clamping mechanism 2 includes left and right clamping units (2a, 2b). The left clamping unit (2a) includes a left joint member 21 and a left clamping member 22. The right clamping unit (2b) includes a right joint member 23 and a right clamping member 24. In this embodiment, the left and right joint members 21, 23 are formed as a joint piece, and the left and right clamping members 22, 24 are formed as a clamping piece that is configured to mate with the joint piece to clamp the anchoring bars 41 therebetween.

The left joint member 21 has a left joint surface 211 which is configured to abut against the left rest region (111a), and a left gripping-side surface 212 which is disposed to face away from the upper portion 11. The right joint member 23 has a right joint surface 231 which is configured to abut against the right rest region (111b), and a right gripping-side surface 232 which is disposed to face away from the upper portion 11.

In this embodiment, the left and right joint surfaces 211, 231 extend in the transverse direction (Y) to be connected to each other along the longitudinal line (L) so as to form a combined joint surface 20 that surrounds the first axis (L1). The combined joint surface 20 includes front and rear joint regions that are opposite to each other relative to a centerline (C) which is transverse to the longitudinal line (L), and that extend uprightly from the centerline (C) to terminate at front and rear clamping-side edges 25, 26, respectively. A front pair of left and right lugs 213, 233 is disposed outboard of the front clamping-side edge 25, has a front pair of lower jaw surfaces 214, 234 that face upwardly, and is spaced from the centerline (C) by a first length. A rear pair of left and right lugs 215, 235 is disposed outboard of the rear clamping-side edge 26, has a rear pair of lower jaw surfaces 216, 236 that face upwardly, and is spaced from the centerline (C) by a second length that is different from the first length. The rear pair of left and right lugs 215, 235 are respectively aligned with the front pair of left and right lugs 213, 233 such that the lower jaw surfaces 214, 216 of the left lugs 213, 215 serve as the left gripping-side surface 212, which has a left gripping cavity that extends in the longitudinal direction (X) to define a left bar-engaging zone, and such that the lower jaw surfaces 234, 236 of the right lugs 233, 235 serve as the right gripping-side surface 232, which has a right gripping cavity that extends in the longitudinal direction (X) to define a right bar-engaging zone. The left and right gripping-side surface 212, 232 surround a second axis (L2) that is parallel to the first axis (L1).

The left clamping member 22 has a left clamping surface 222 disposed to confront the left gripping-side surface 212. The right clamping member 24 has a right clamping surface 242 disposed to confront the right gripping-side surface 232. In this embodiment, the left and right clamping surfaces 222, 242 extend in the transverse direction (Y) to form a combined clamping surface 27. The combined clamping surface 27 has a tightening region 271 which extends in the longitudinal direction (X). In this embodiment, the left clamping surface 222 includes front and rear upper jaw surfaces 224, 226 which are spaced apart from each other in the longitudinal direction (X) and which cooperatively define a left clamping cavity. The right clamping surface 242 includes front and rear upper jaw surfaces 244, 246 which are spaced apart from each other in the longitudinal direction (X) and which cooperatively define a right clamping cavity.

The front upper jaw surfaces 224, 244 are configured to respectively mate with the front pair of lower jaw surfaces 214, 234, and the rear upper jaw surfaces 226, 246 are configured to respectively mate with the rear pair of lower jaw surfaces 216, 236 so as to permit the lengthwise segments 411 of the left and right anchoring bars 41 to be clamped in the left and right bar-engaging zones, respectively.

The tightening unit 3 includes front and rear internally threaded tightening members 34, 31 which respectively surround the front and rear tightening lines, and front and rear externally threaded tightening members 33, 32 which respectively extend along the front and rear tightening lines, and which are brought to extend through front and rear through holes 28, 29 in the tightening region 271 to be engaged respectively and threadedly with the front and rear internally threaded tightening members 34, 31 so as to tighten the combined clamping surface 27 against the upper portion 11.

In this embodiment, the front internally threaded tightening member 34 is a screw nut, and the front and rear externally threaded tightening members 33, 32 are screw bolts. The rear internally threaded tightening member 31 is of a tubular shape, is fitted in the inserting hole 114, and has a threaded hole 311 aligned with the rear bore 113.

The tightening unit 3 further includes a screw bolt 35 which extends through two locking holes 15 in two lugs 14 at two sides of the split 13 and which is threadedly engaged with a screw nut 36 so as to tighten the lower portion 12 to the seat tube 5. In addition, by virtue of the locking engagement between the screw bolt 35 and the screw nut 36, a rear abutment surface which defines the rear bore 113 can be tightened around the screw bolt 32 in the rear bore 113.

FIG. 5 illustrates the clamping mechanism 2 in a first position, where left and right lugs 213, 233 (that is, front edges of the left and right bar-engaging zones) in the front pair respectively face the front ends 412 of the left and right anchoring bars 41, and where the left and right bar-engaging zones are proximate to the rear ends 413 of the left and right anchoring bars 41. In the state shown in FIG. 5, left and right lugs 235, 215 (that is, rear edges of the left and right bar-engaging zones) in the rear pair reach the rear ends 413 so that the seat 4 cannot be further moved forwardly relative to the seat tube 5.

Figure 6:
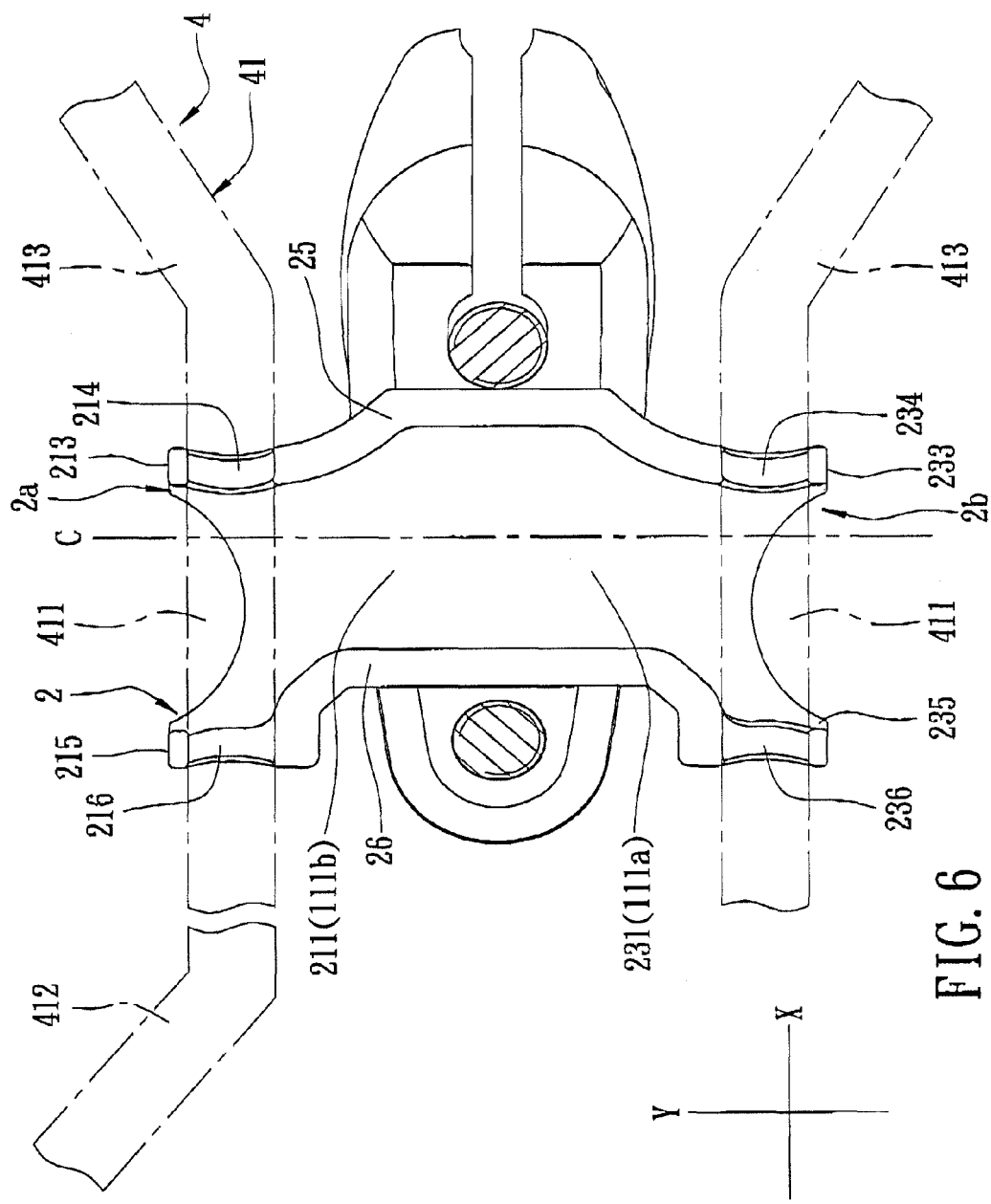
FIG. 6 is a cross-sectional view similar to FIG. 5 and showing the clamping mechanism in a second position.

When it is desired to move forwardly the seat 4 relative to the seat tube 5, as shown in FIG. 6, the screw bolts 32, 33 are released from the screw nuts 31, 34, and the clamping mechanism 2 is turned about 180 degrees to a second position such that the left and right clamping units (2a, 2b) switch places to permit the left and right joint surfaces 211, 231 to respectively abut against the right and left rest regions (111b, 111a), and to permit the front pair of left and right lugs 213, 233 to face the rear ends 413. Thus, the left and right bar-engaging zones can be moved to be proximate to the front ends 412 so as to permit forward movement of the anchoring bars 41 relative to the clamping mechanism 2 to thereby move forwardly the seat 4 relative to the seat tube 5.

Figure 7:
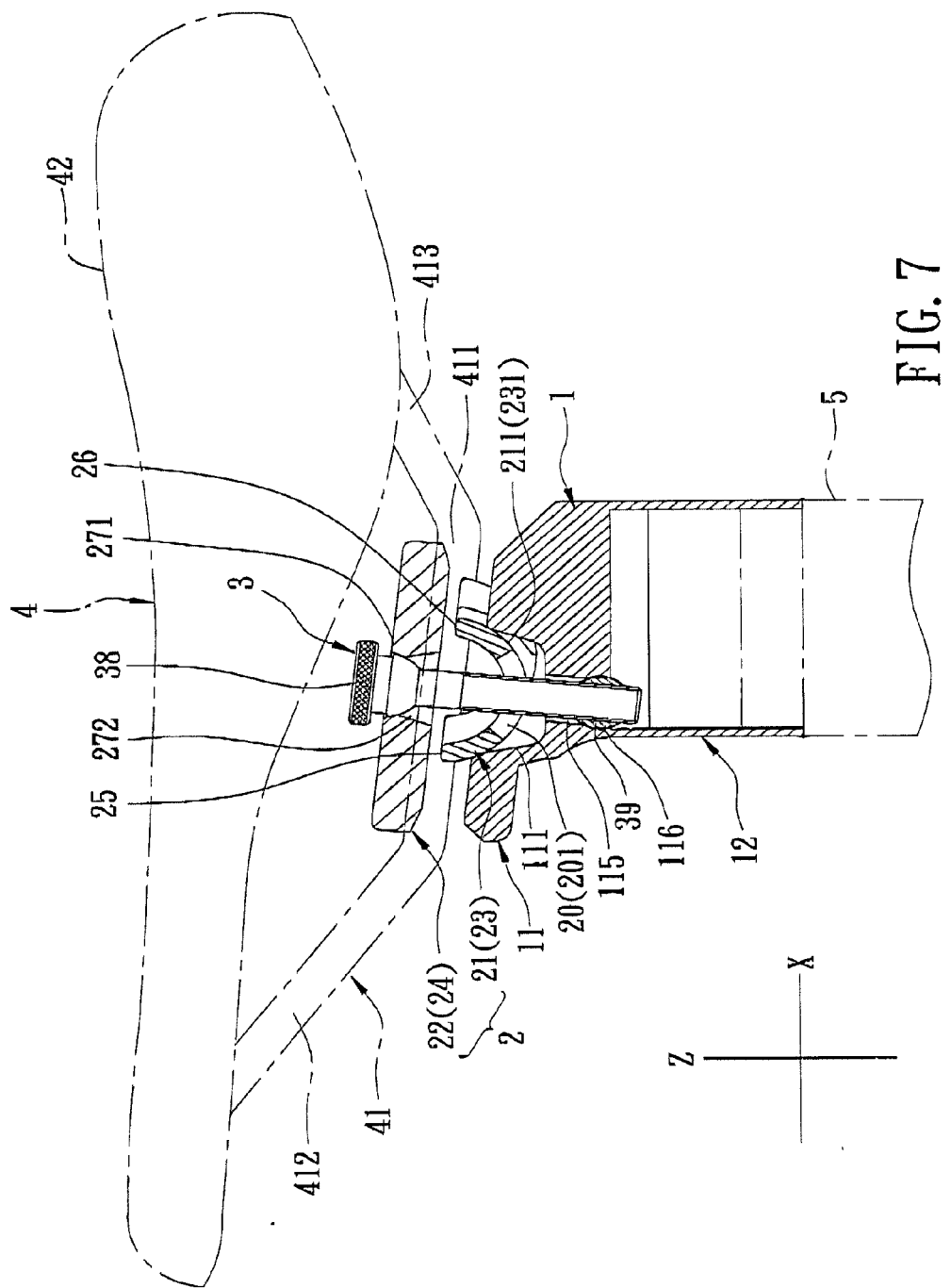
FIG. 7 is a sectional view of the second preferred embodiment of a positioning device according to this invention.

Referring to FIG. 7, the second preferred embodiment of a positioning device according to this invention is shown to be similar to the first preferred embodiment in construction, except that the lower portion 12 of the mount 1 is secured to the seat tube 5 by welding. In addition, the upper portion 11 of the mount 1 has a bore 115 which extends downwardly from the rest wall surface 111 along a tightening line, and an inserting hole 116 which extends transversely and which is communicated with the bore 115. The clamping mechanism 2 has through holes 272, 201 formed in the tightening region 271 and the combined joint surface 20 and extending along the tightening line. The tightening unit 3 includes an externally threaded tightening member, such as a screw bolt 38, which is brought to extend through the through holes 272, 201 into the bore 115, and an internally threaded tightening member, such as a tubular screw nut 39, which is fitted into the inserting hole 116 so as to be threadedly engaged with the screw bolt 38 to thereby tighten the anchoring bars 41 of the seat 4 to the seat tube 5. Thus, the number of components of the tightening unit 3 is relatively decreased.

Figure 8:
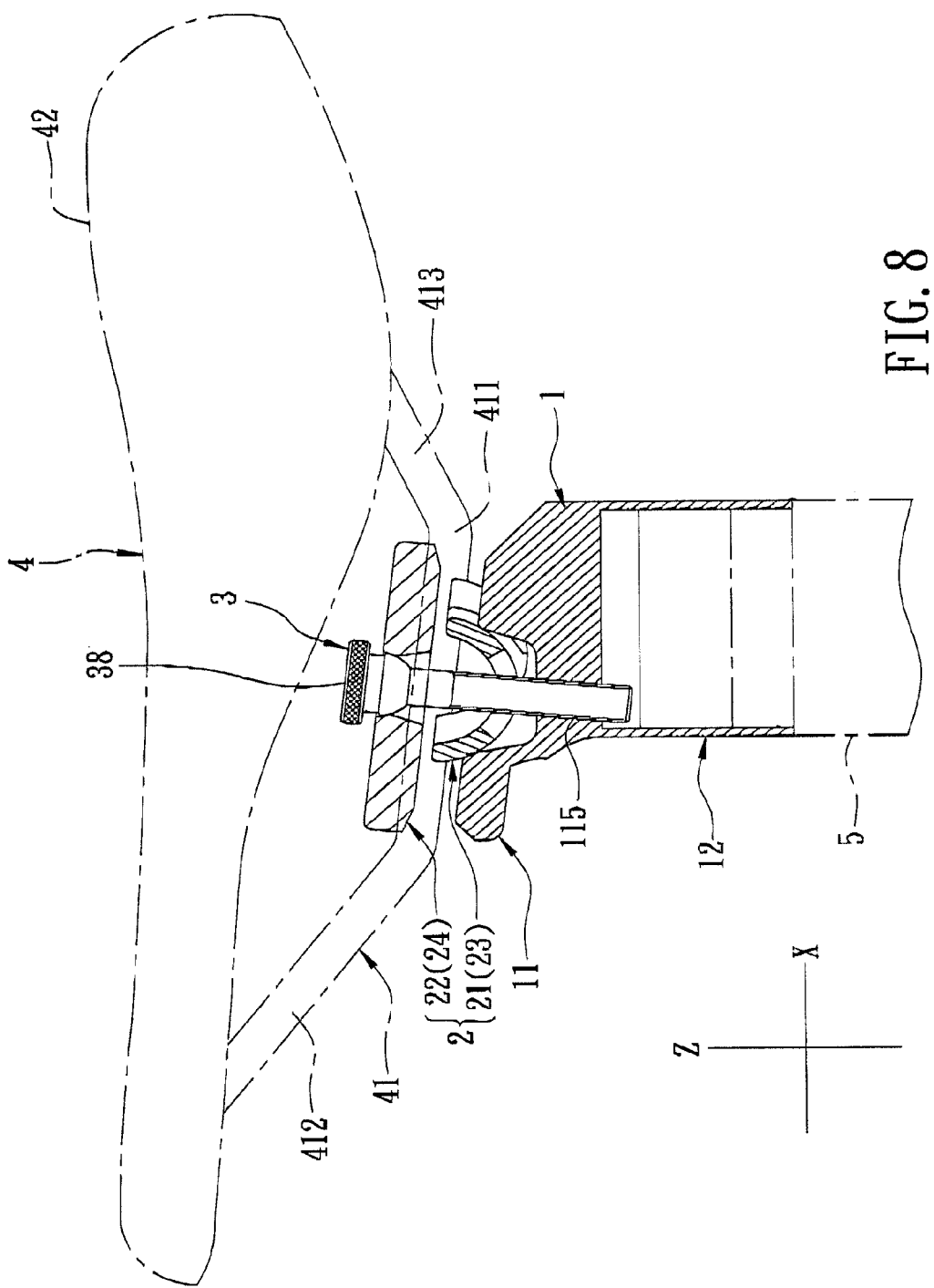
FIG. 8 is a sectional view of a modified form of the second preferred embodiment of FIG. 7.

Alternatively, as shown in FIG. 8, the inner surface of the bore 115 may be formed with threads to serve as the internally threaded tightening member for threaded engagement with the screw bolt 38, so that the screw nut 31 and the inserting hole 114 may be dispensed with.

Figure 9:
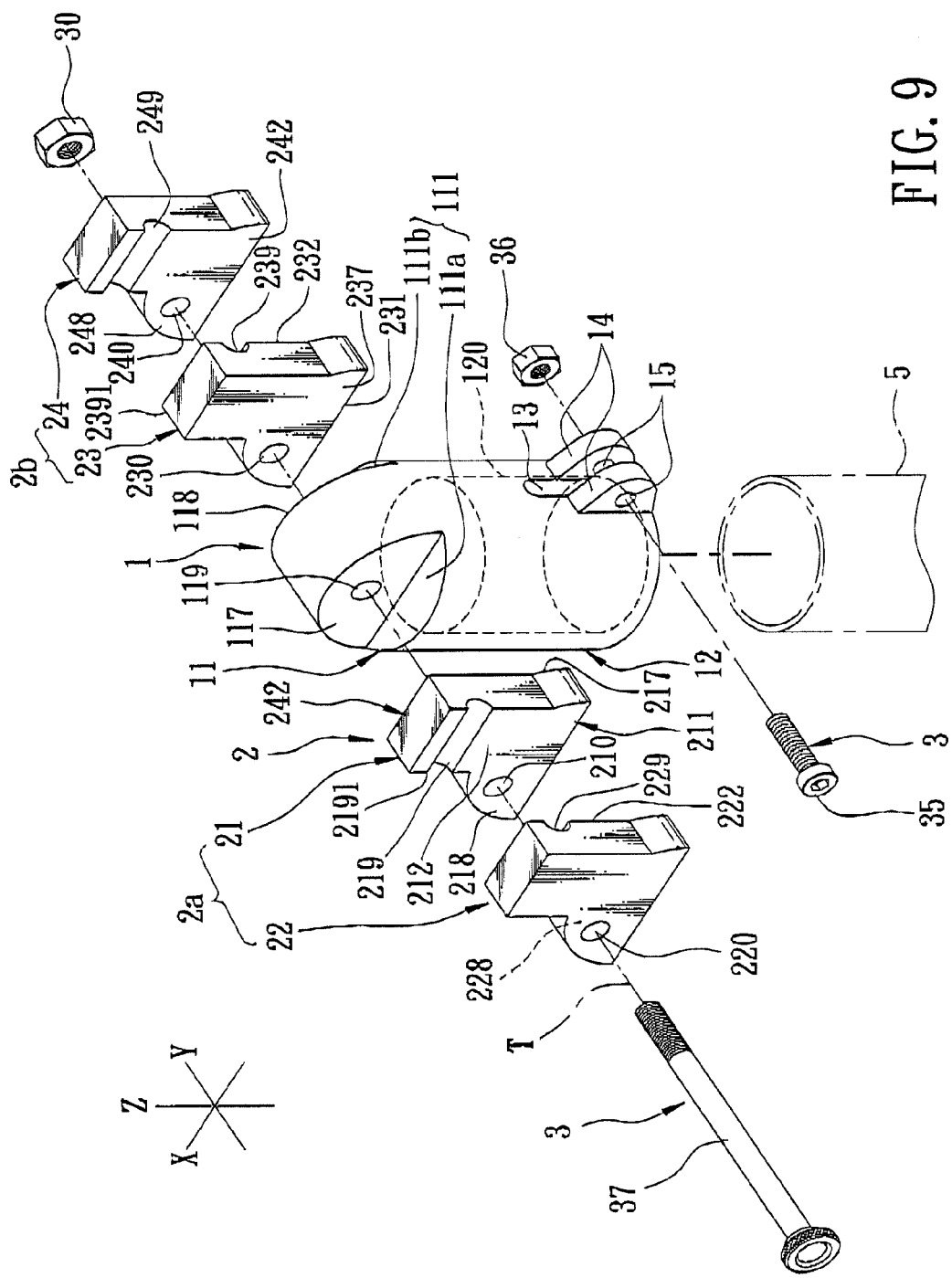
FIG. 9 is an exploded perspective view of the third preferred embodiment of a positioning device according to this invention.
Figure 10:
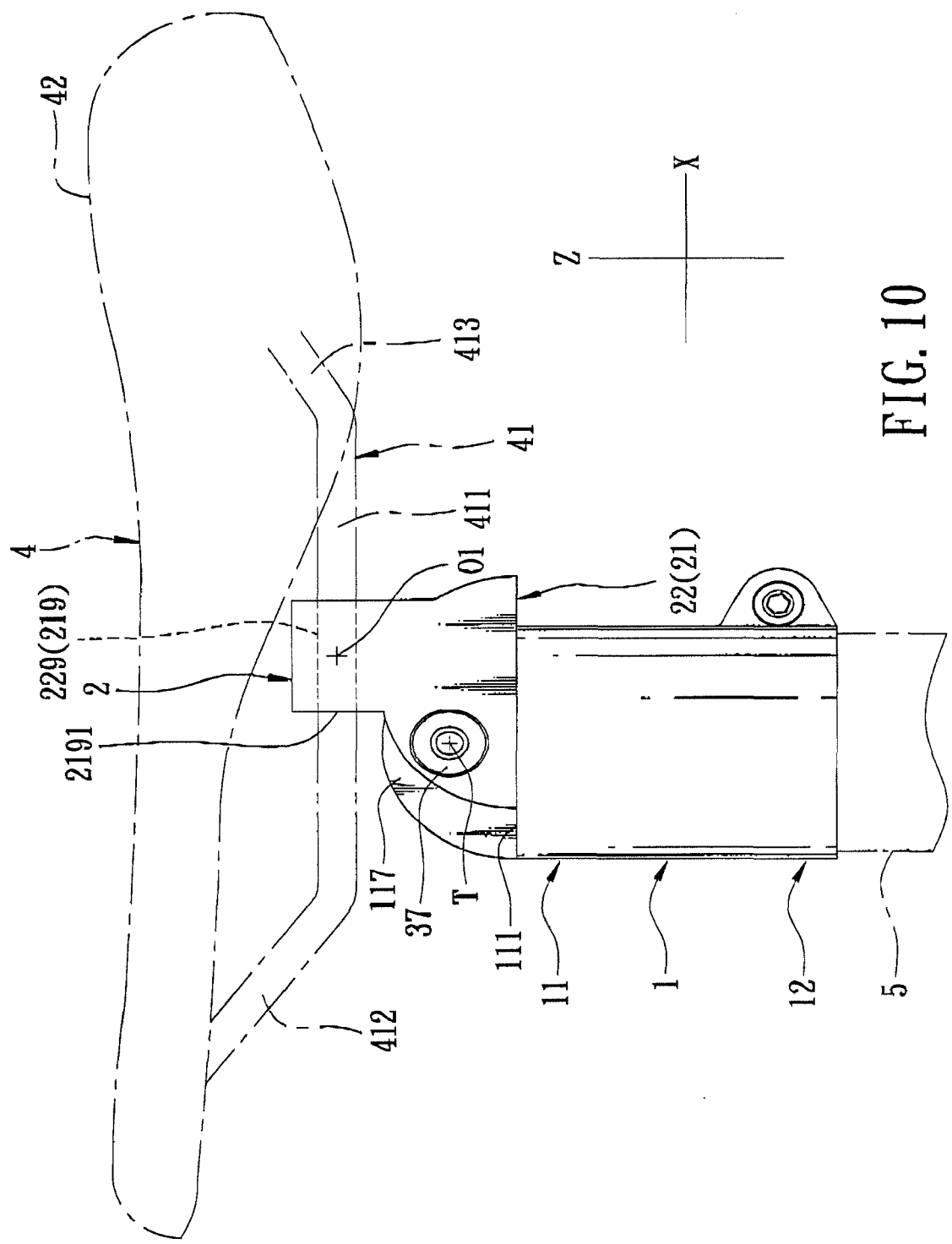
FIG. 10 is a schematic side view of the third preferred embodiment, showing a clamping mechanism thereof in a first position.

Referring to FIGS. 9 and 10, the third preferred embodiment of a positioning device according to this invention is similar to the first preferred embodiment in construction. In this embodiment, the upper portion 11 of the mount 1 has left and right abutment surfaces 117, 118 which are opposite to each other in the transverse direction (Y), and a through hole 119 extending in the transverse direction (Y) along a tightening line (T) through the left and right abutment surfaces 117, 118.

The left and right joint members 21, 23 respectively have left and right anchoring surfaces 217, 237 which are opposite to the left and right gripping-side surfaces 212, 232, respectively, in the transverse direction (Y), and which are brought to abut against the left and right abutment surfaces 117, 118, respectively. Each of the left and right gripping-side surfaces 212, 232 and the left and right clamping surfaces 222, 242 has a tightened region 218, 238, 228, 248 disposed forwardly of the corresponding gripping or clamping cavity 219, 239, 229, 249. The gripping and clamping cavities 219, 239, 229, 249 defines a central point (O1) which is offset from the tightening line (T). The tightening regions 218, 238, 228, 248 are disposed along the tightening line (T), and respectively have through bores 210, 230, 220, 240 which extend through the tightening regions 218, 238, 228, 248 and which are disposed to be aligned with the through hole 119. In addition, the left and right clamping members 22, 24 are constructed to have the same configurations as the right and left joint members 23, 21, respectively.

The tightening unit 3 includes an internally threaded tightening member, such as a screw nut 30, which surrounds the tightening line (T), and an externally threaded tightening member, such as a screw bolt 37, which is brought to extend through the through bores 210, 230, 220, 240 in the tightened regions 218, 238, 228, 248 and the through hole 119 to be threadedly engaged with the screw nut 30 so as to tighten the left and right clamping members 22, 24 against the upper portion 11.

Figure 11:
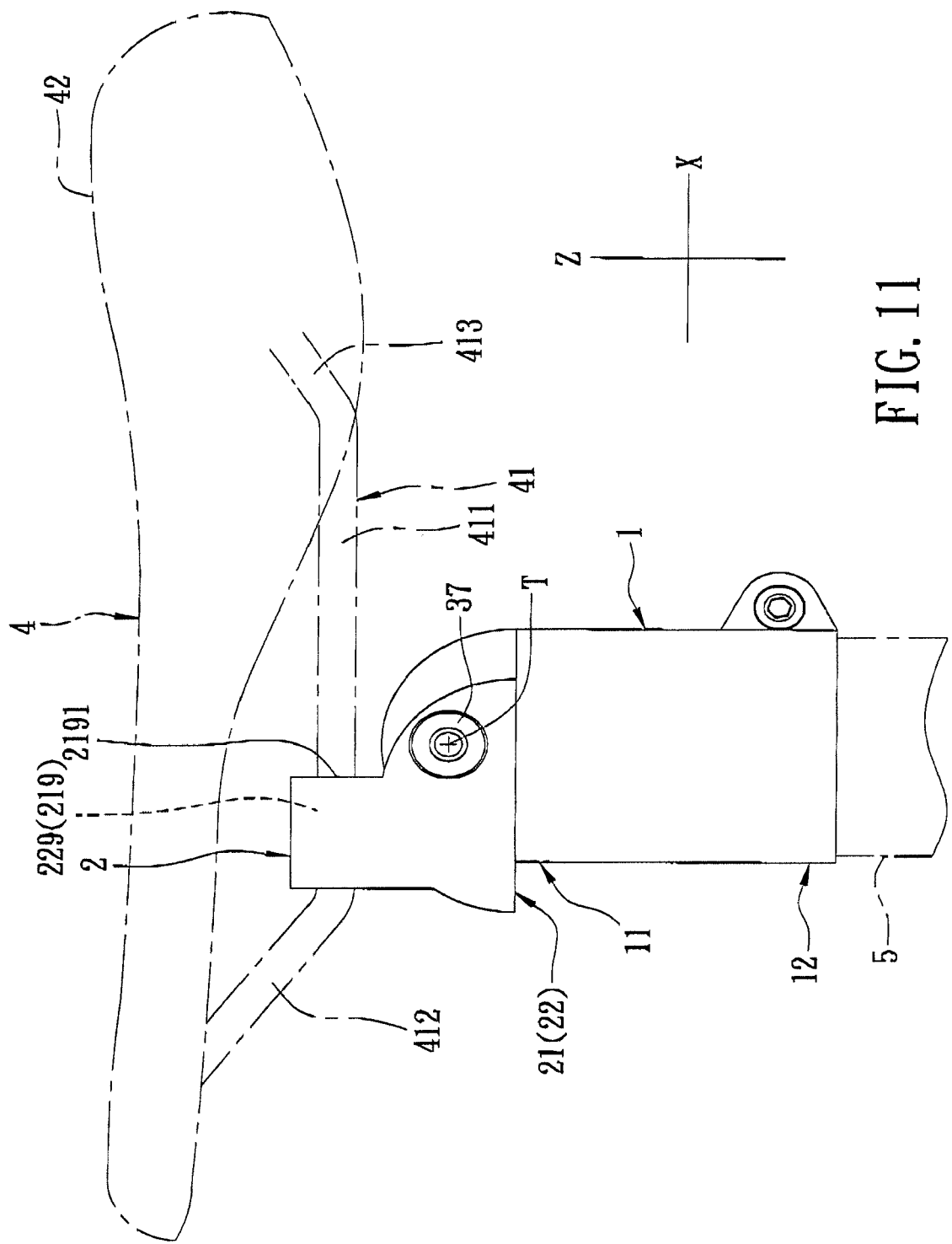
FIG. 11 is a schematic side view similar to FIG. 10, showing the clamping mechanism in a second position.

When it is desired to increase the extent of movement of the seat 4 in a forward direction relative to the seat tube 5, the screw bolt 37 is released from the screw nut 30, and the left and right clamping units (2a, 2b) are turned about 180 degrees relative to the upper portion 11 from the first position (see FIG. 10) to the second position (see FIG. 11) so as to permit the front edges 2191, 2391 of the left and right gripping cavities 219, 239 to face the rear ends 413 of the anchoring bars 41. Since the tightening line (T) along which the tightened regions 218, 238, 228, 248 are aligned with the through hole 119 remains unchanged, and since each of the tightened regions 218, 238, 228, 248 is disposed forwardly of the corresponding cavity 219, 239, 229, 249, when the left and right clamping units (2a, 2b) are turned from the first position to the second position, the left and right bar-engaging zones respectively defined by the left and right gripping cavities 219, 239 are moved to be proximate to the front ends 412, so that the seat 4 can be moved forwardly relative to the seat tube 5 to a greater extent.

As illustrated, with the construction of the positioning device according to this invention, it is possible to adjust the position of the seat 4 in a front-and-rear direction by virtue of movement of the left and right anchoring bars 41 relative to the clamping mechanism 2. Moreover, the extent of movement can be increased by mere displacement of the clamping mechanism 2 from the first position to the second position. Thus, it is possible to easily adjust the seat 4 to a desired position.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A positioning device for mounting a seat on a seat tube of a bicycle, the seat including a saddle body extending in a longitudinal direction, and left and right anchoring bars, each having front and rear ends opposite to each other in the longitudinal direction and connected to the saddle body, and a lengthwise segment interposed between the front and rear ends, the lengthwise segments being spaced apart from each other in a transverse direction, said positioning device comprising:

a mount having a lower portion which is adapted to be securely mounted on the seat tube, and an upper portion opposite to said lower portion in an upright direction that is transverse to the longitudinal and transverse directions, said upper portion having a rest wall surface which faces upwardly and which has left and right rest regions that are opposite to each other relative to a longitudinal line extending in the longitudinal direction;

a left clamping unit including
   a left joint member having
      a left joint surface which is configured to abut against said left rest region, and
      a left gripping-side surface which is disposed to face away from said upper portion, and which has a left gripping cavity that extends in the longitudinal direction to define a left bar-engaging zone, and that terminates at front and rear edges, and
   a left clamping member having a left clamping surface which is disposed to confront said left gripping-side surface, and which has a left clamping cavity that is configured to mate with said left gripping cavity so as to permit the lengthwise segment of the left anchoring bar to be clamped in said left bar-engaging zone in a first position, where said front edge faces the front end of the left anchoring bar and where said left bar-engaging zone is proximate to one of the front and rear ends of the left anchoring bar; and a right clamping unit including
a right joint member having
a right joint surface which is configured to abut against said right rest region, and
   a right gripping-side surface which is disposed to face away from said upper portion, and which has a right gripping cavity that extends in the longitudinal direction to define a right bar-engaging zone, and that terminates at front and rear edges;
   a right clamping member having a right clamping surface which is disposed to confront said right gripping-side surface, and which has a right clamping cavity that is configured to mate with said right gripping cavity so as to permit the lengthwise segment of the right anchoring bar to be clamped in said right bar-engaging zone proximate to a corresponding one of the front and rear ends of the right anchoring bar and to permit said front edge to face the front end of the right anchoring bar when said lengthwise segment of the left anchoring bar is clamped in the first position, said left and right joint surfaces extending in the transverse direction to be connected to each other along the longitudinal line so as to form a combined joint surface, said combined joint surface including front and rear joint regions that are opposite to each other relative to a centerline which is transverse to the longitudinal line, and that extend uprightly from the centerline to terminate at front and rear clamping-side edges, respectively;

a front pair of left and right lugs which is disposed outboard of said front clamping-side edge which is spaced from the centerline length, which has a front pair of lower jaw surfaces, said lower jaw surfaces facing upwardly and respectively serving as said front edges of said left and right bar-engaging zones; and a rear pair of left and right lugs which is disposed outboard of said rear clamping-side edge, which is spaced from the centerline by a second length that is different from the first length, and which has a rear pair of lower jaw surfaces, said lower jaw surfaces facing upwardly and respectively serving as said rear edges of said left and right bar-engaging zones;

said rear pair of left and right lugs being respectively aligned with said front pair of left and right lugs such that said lower jaw surfaces of said left lugs serve as said left gripping-side surface to thereby define said left bar-engaging zone, and said lower jaw surfaces of said right lugs serve as said right gripping-side surface to thereby define said right bar-engaging zone;

such that,
   when said left and right joint surfaces switch places so as to abut against said right and left rest regions, respectively, or when said left and right clamping units are shifted so as to permit said front edges of said left and right bar-engaging zones to face the rear ends of the left and right anchoring bars, respectively, said left and right bar-engaging zones are displaced to a second position, where said left bar-engaging zone is proximate to the other one of the front and rear ends of the left anchoring bar, and
such that,
   when said left and right bar-engaging zones are displaced from the first position to the second position, at least one tightening line, along which said left and right clamping members are brought to clamp the lengthwise segments of the left and right anchoring bars onto said upper portion, remains unchanged.

2. The positioning device according to claim 1, wherein said left and right clamping surfaces extend in the transverse direction to be connected to each other to form a combined clamping surface which has a tightening region that extends in the longitudinal direction, each of said left and right clamping cavities having front and rear upper jaw surfaces which are spaced apart from each other in the longitudinal direction, said front upper jaw surfaces of said left and right clamping cavities being configured to respectively mate with said front pair of lower jaw surfaces, said rear upper jaw surfaces of said left and right clamping cavities being configured to respectively mate with said rear pair of lower jaw surfaces.

3. The positioning device according to claim 2, further comprising an internally threaded tightening member which surrounds the tightening line, and an externally threaded tightening member which extends along the tightening line and which is brought to extend through said tightening region and said combined joint surface to be threadedly engaged with said internally threaded tightening member so as to tighten said combined clamping surface against said upper portion.

4. The positioning device according to claim 2, wherein the at least one tightening line includes front and rear tightening lines that are at longitudinally opposite sides of said rest wall surface, said positioning device further comprising front and rear internally threaded tightening members which respectively surround the front and rear tightening lines, and front and rear externally threaded tightening members which respectively extend along the front and rear tightening lines, and which are brought to extend through said tightening region to be engaged respectively and threadedly with said front and rear internally threaded tightening members so as to tighten said combined clamping surface against said upper portion.

5. The positioning device according to claim 4, wherein said rear internally threaded tightening member is embedded in said upper portion, said upper portion having a rear abutment surface which defines a rear bore that extends along the rear tightening line to permit access of said rear externally threaded tightening member to said rear internally threaded tightening member.

6. The positioning device according to claim 5, wherein said upper portion has an inserting hole which extends in the transverse direction to intersect said rear bore, said rear internally threaded tightening member being of a tubular shape and being fitted into said inserting hole so as to be aligned with said rear bore.

7. The positioning device according to claim 6, wherein said mount has a split which is disposed rearwardly of said rear bore, which extends through said upper and lower portions, and which is communicated with said rear bore so as to permit tightening of said rear externally threaded tightening member in said rear bore.

8. A positioning device for mounting a seat on a seat tube of a bicycle, the seat including a saddle body extending in a longitudinal direction, and left and right anchoring bars, each having front and rear ends opposite to each other in the longitudinal direction and connected to the saddle body, and a lengthwise segment interposed between the front and rear ends, the lengthwise segments being spaced apart from each other in a transverse direction, said positioning device comprising:
- a mount having a lower portion which is adapted to be securely mounted on the seat tube, and an upper portion opposite to said lower portion in an upright direction that is transverse to the longitudinal and transverse directions, said upper portion having a rest wall surface which faces upwardly and which has left and right rest regions that are opposite to each other relative to a longitudinal line extending in the longitudinal direction, said upper portion having left and right abutment surfaces which are opposite to each other in the transverse direction;
- a left clamping unit including:
    - a left joint member having
        - a left joint surface which is configured to abut against said left rest region,
        - a left gripping-side surface which is disposed to face away from said upper portion, which has a left gripping cavity that extends in the longitudinal direction to define a left bar-engaging zone, and that terminates at front and rear edges,
        - a left anchoring surface which is opposite to said left gripping-side surface in the transverse direction, and which is brought to abut against said left abutment surface, and
    - a left clamping member having a left clamping surface which is disposed to confront said left gripping-side surface, and which has a left clamping cavity that is configured to mate with said left gripping cavity so as to permit the lengthwise segment of the left anchoring bar to be clamped in said left bar-engaging zone in a first position, where said front edge faces the front end of the left anchoring bar and where said left bar-engaging zone is proximate to one of the front and rear ends of the left anchoring bar; and
- a right clamping unit including
    - a right joint member having
        - a right joint surface which is configured to abut against said right rest region,
        - a right gripping-side surface which is disposed to face away from said upper portion, and which has a right gripping cavity that extends in the longitudinal direction to define a right bar-engaging zone, and that terminates at front and rear edges,
        - a right anchoring surface which is opposite to said right gripping-side surface in the transverse direction, and which is brought to abut against said right abutment surface, and
    - a right clamping member having a right clamping surface which is disposed to confront said right gripping-side surface, and which has a right clamping cavity that is configured to mate with said right gripping cavity so as to permit the lengthwise segment of the right anchoring bar to be clamped in said right bar-engaging zone proximate to a corresponding one of the front and rear ends of the right anchoring bar and to permit said front edge to face the front end of the right anchoring bar when said lengthwise segment of the left anchoring bar is clamped in the first position said left and right joint members being configured such that, when said left and right joint surfaces switch places so as to abut against said right and left rest regions, respectively, or when said left and right clamping units are shifted so as to permit said front edges of said left and right bar-engaging zones to face the rear ends of the left and right anchoring bars, respectively, said left and right bar-engaging zones are displaced to a second position, where said left bar-engaging zone is proximate to the other one of the front and rear ends of the left anchoring bar, and such that, when said left and right bar-engaging zones are displaced from the first position to the second position, at least one tightening line, along which said left and right clamping members are brought to clamp the lengthwise segments of the left and right anchoring, bars onto said upper portion, remains unchanged.

9. The positioning device according to claim 8, wherein said upper portion has a through hole extending in the transverse direction along the tightening line through said left and right abutment surfaces, each of said left and right gripping-side surfaces and said left and right clamping surfaces having a tightened region which is disposed forwardly of a corresponding one of said left and right gripping cavities and said left and right clamping cavities, said positioning device further comprising an internally threaded tightening member which surrounds the tightening line, and an externally threaded tightening member which is brought to extend through said tightened regions and said through hole to be threadedly engaged with said internally threaded tightening member so as to tighten said left and right clamping members against said upper portion.

10. The positioning device according to claim 9, wherein said left and right clamping members are constructed to have the same configurations as said right and left joint members, respectively.

* * * * *